(12) United States Patent
Dick et al.

(10) Patent No.: US 8,549,488 B2
(45) Date of Patent: Oct. 1, 2013

(54) VALIDATING A VARIABLE DATA ITEM IN A SOFTWARE ROUTINE

(75) Inventors: Adrian D. Dick, Southampton (GB); Gordon D. Hutchison, Eastleigh (GB); Clive R. Kates, Redlynch (GB)

(73) Assignee: International Business Machines Corporation, Armonk, NY (US)

( * ) Notice: Subject to any disclaimer, the term of this patent is extended or adjusted under 35 U.S.C. 154(b) by 2481 days.

(21) Appl. No.: 10/947,809

(22) Filed: Sep. 23, 2004

(65) Prior Publication Data

US 2005/0091648 A1 Apr. 28, 2005

(30) Foreign Application Priority Data

Oct. 22, 2003 (GB) .................................. 0324605.5

(51) Int. Cl.
*G06F 9/44* (2006.01)
(52) U.S. Cl.
USPC .......................................................... 717/130
(58) Field of Classification Search
USPC ................................................. 717/124–132
See application file for complete search history.

(56) References Cited

U.S. PATENT DOCUMENTS

| | | | | |
|---|---|---|---|---|
| 5,828,890 A | | 10/1998 | Rehbock et al. ............... | 395/733 |
| 5,872,979 A | * | 2/1999 | Edel et al. ....................... | 717/170 |
| 5,950,003 A | * | 9/1999 | Kaneshiro et al. ............. | 717/130 |
| 6,070,009 A | * | 5/2000 | Dean et al. ...................... | 717/130 |
| 6,374,369 B1 | * | 4/2002 | O'Donnell ....................... | 714/38 |
| 6,389,596 B2 | * | 5/2002 | LoMedico ........................ | 2/20 |
| 6,941,545 B1 | * | 9/2005 | Reese et al. ..................... | 717/130 |
| 6,954,923 B1 | * | 10/2005 | Yates et al. ...................... | 717/130 |
| 6,959,443 B2 | * | 10/2005 | Ohgaki ............................ | 720/603 |
| 6,983,461 B2 | * | 1/2006 | Hutchison et al. ............. | 718/104 |
| 7,013,290 B2 | * | 3/2006 | Ananian .................. | 707/999.102 |
| 7,013,456 B1 | * | 3/2006 | Van Dyke et al. ............. | 717/130 |
| 7,210,118 B2 | * | 4/2007 | Hastings ......................... | 717/100 |
| 7,263,551 B2 | * | 8/2007 | Belfiore et al. ................ | 709/219 |
| 7,467,142 B2 | * | 12/2008 | Sinn et al. .............. | 707/999.003 |
| 2003/0155672 A1 | * | 8/2003 | Kazmer et al. ................ | 264/40.1 |
| 2004/0034639 A1 | * | 2/2004 | McFadden ....................... | 707/10 |

FOREIGN PATENT DOCUMENTS

EP 1 296 247 A1 3/2003
WO WO 01/48608 A2 7/2001

* cited by examiner

*Primary Examiner* — Anna Deng
*Assistant Examiner* — Junchun Wu
(74) *Attorney, Agent, or Firm* — Steven M. Greenberg, Esq.; Carey, Rodriguez, Greenberg & O'Keefe

(57) ABSTRACT

An apparatus for validating a value of a variable data item in a software routine in execution includes a profile set generator that generates a profile set of typical values of the variable data item, a profile rule generator that generates a profile rule representing the profile set, and a profile checker that determines if a value of the variable data item satisfies the profile rule.

96 Claims, 7 Drawing Sheets

VALIDATING A VARIABLE DATA ITEM IN A SOFTWARE ROUTINE

BACKGROUND OF THE INVENTION

This invention relates to the validation of a variable data item in a software routine in execution, and more particularly, to the generation of a profile rule for the variable data item which can be used to identify situations where a value of the variable data item is not a typical value.

Errors in a software application can be caused by the storage of inappropriate values in data items within the application. For example, a data item which is defined to store a numerical indicator for a calendar month can typically be expected to include values in the range of one to twelve inclusive, corresponding to the months January to December. A value of thirteen in such a data item may cause subsequent errors in the software application. An inappropriate value assigned to a data item in an application may not initially be identified as inappropriate, and only when the value of the data item is subsequently read or used by the application may errors occur.

Where a data item is intended to store values which can be anticipated at application development time, validity checks can be inserted into the application by programmers to ensure the data item is assigned valid values during execution. However, where the intended values of a data item cannot be anticipated at the time of application development, such validation checks cannot be used. For example, a memory pointer in an application contains an address to a location in a memory of a computer system. Typically, memory pointers are expressed in hexadecimal or binary notation and are provided by an operating system of the computer system when a unit of memory is allocated. The value of a memory pointer in an application is usually determined at runtime, and depends on the configuration of aspects of the computer system including, among other things: the implementation of memory in the computer system; the operating system of the computer system; and the architecture of the computer system. Thus, valid values of the memory pointer cannot be foreseen at the time of application development. It is therefore not usually possible for a programmer to validate a value of a memory pointer data item in a computer system.

While the value of a memory pointer cannot be foreseen at the time of application development, memory pointers will usually exhibit common characteristics. One cause of common characteristics in memory pointers can arise due to the way memory is allocated in a computer system, and is described below. FIG. 1a is a schematic diagram illustrating an arrangement of a memory in a computer system in the prior art. Memory 152 comprises multiple memory locations 154, each including a byte of storage 156 and a location address 158. Each byte of storage 156 is eight binary digits (bits) in length, and the memory locations 154 are therefore known as eight-bit memory locations. The location address 158 for each of the memory locations 154 is a reference to the memory location 154 in the memory 152. Location addresses 158 are numbered sequentially using binary notation. The memory 152 can be accessed by a software application using an operating system and a central processing unit (CPU) (all not shown). At each memory access, a fixed quantity of data can be read from, or written to, the memory 152 by the CPU. This quantity of data is known as a "word", and the size of a word may vary with different CPU configurations. For example, an Intel® Pentium® 3 microprocessor (Intel and Pentium are registered trademarks of Intel Corporation) has a word size of thirty-two bits. In contrast, an Intel® 80286 microprocessor has a word size of sixteen bits. In FIG. 1a, the multiple memory locations 154 are divided into words 160 in accordance with a CPU word size of sixteen bits. Thus each of the words 160 in FIG. 1a corresponds to two contiguous eight-bit memory locations 154. Each of the words 160 includes a word address 162 and data 164. The word address 162 of each of the words 160 is the location address 158 of a first of the two memory locations 154 in the word 160. The data 164 of each of the words 160 comprises the two bytes of storage 156 in both the first and a second of memory locations 154 in the word 160. Because the CPU only accesses the memory 152 a word 160 at a time, only the word addresses 162 is used by the CPU to access memory 152. Similarly, the operating system and software application use only the word addresses 162 to access the memory 152. This is known as a "word aligned" memory model because all memory locations 154 are accessed as words 160.

It is the word alignment of data in a memory 152 which can give rise to common characteristics of memory pointers in a software application. In a sixteen bit memory configuration (as illustrated in FIG. 1a), each of the words 160 has a word address 162 equal to the location address 158 of the first of the memory locations 154 in the word 160. Thus, the location address 158 of the second of the memory locations 154 in each of the words 160 is never referenced directly. An application uses only word addresses 162 to reference memory 152 and so all memory pointers in the application will point to a memory location 154 which is the first memory location 154 in a word 160. No memory pointers will point to a memory location 154 which is the second memory location 154 in a word 160. In a sixteen bit memory configuration this results in all memory pointers being a multiple of two, and thus the least significant bit of all memory pointers will be zero. Similarly, in a thirty-two bit memory configuration, all memory pointers will be a multiple of four, and thus the least significant two bits of all memory pointers will be zero. Thus, in a word aligned configuration of a memory, memory pointers in an application exhibit common characteristics.

BRIEF SUMMARY OF THE INVENTION

According to one aspect of the present invention, a method for operating a validator to validate a variable data item in a software routine in execution comprises recording a first value of the variable data item to a profile set of values in a data store, recording a second value of the variable data item to the profile set of values in the data store, creating a profile rule, wherein said profile rule represents the profile set of values, and determining if a third value of the variable data item satisfies the profile rule.

According to another aspect of the present invention, a computer program product for validating a variable data item, the computer program product comprises a computer readable medium having computer readable program code embodied therein. The computer readable program code comprises computer readable program code configured to record a first value of the variable data item to a profile set of values in a data store, computer readable program code configured to record a second value of the variable data item to the profile set of values in the data store, computer readable program code configured to create a profile rule, wherein said profile rule represents the profile set of values, and computer readable program code configured to determine if a third value of the variable data item satisfies the profile rule.

According to a further aspect of the present invention, an apparatus for validating a value of a variable data item in a software routine in execution comprises a profile set generator for generating a profile set of typical values of the variable data item, a profile rule generator for generating a profile rule representing the profile set, and a profile checker for determining if a value of the variable data item satisfies the profile rule.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1A:
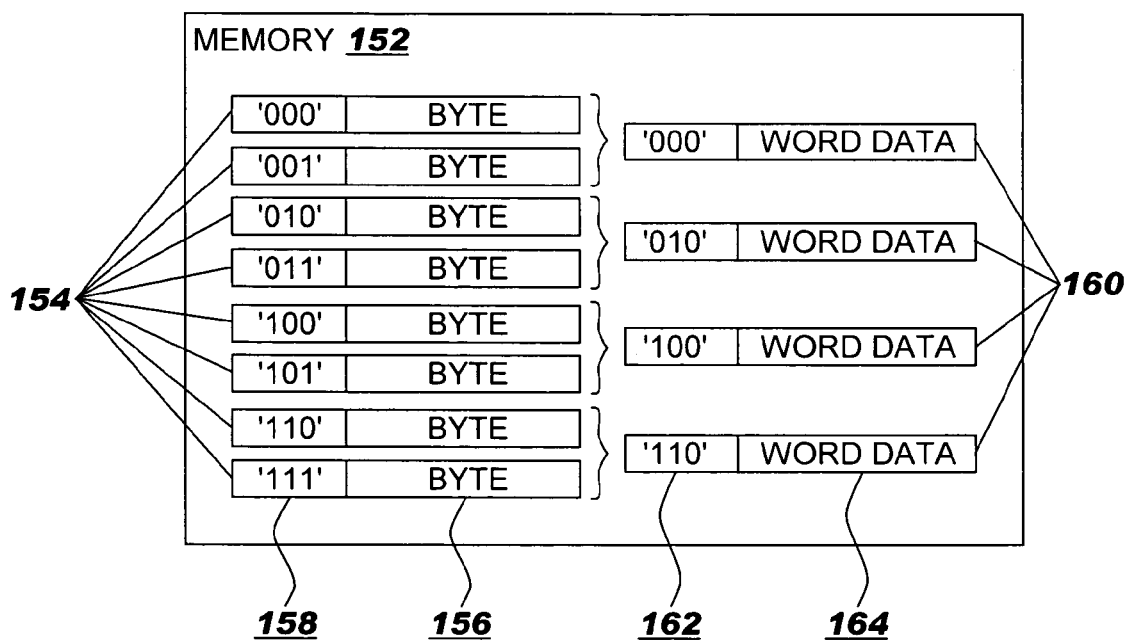
FIG. 1a is a schematic diagram illustrating an arrangement of a memory in a computer system in the prior art.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable or computer-readable medium may be a computer-usable or computer-readable storage medium that is not a signal medium.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

Figure 1B:
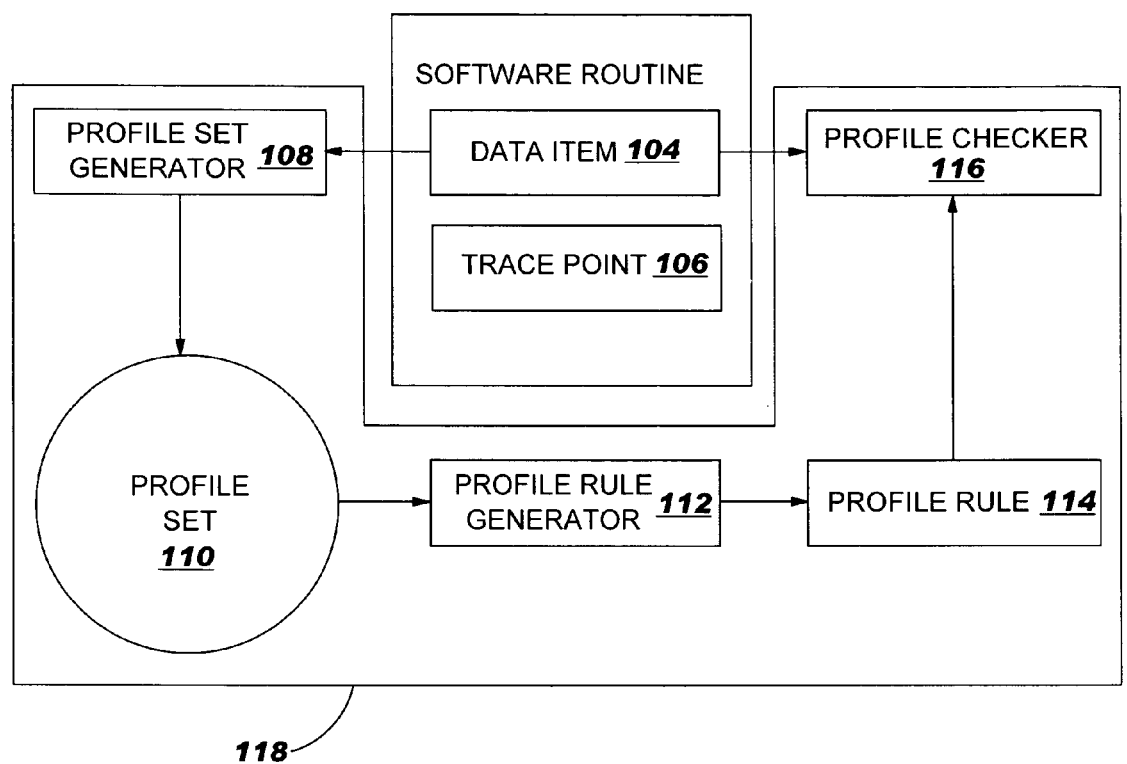
FIG. 1b is a schematic diagram illustrating a configuration of a computer system in accordance with one aspect of the present invention.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. FIG. 1b is a schematic diagram illustrating a configuration of a computer system in accordance with an aspect of the present invention. The computer system (not illustrated) includes a software routine 102 in execution. In the illustrated embodiment, software routine 102 is a software module such as a software method of a Java® application (Java® is a registered trademark of Sun Microsystems Inc.) and comprises a list of software instructions which execute in the computer system. Alternatively, software routine 102 can be a software application or a subroutine within a software application such as a software function. The software routine 102 includes a data item 104 which is stored in a data store of the computer system. In the illustrated embodiment data item 104 is stored in a memory of the computer system, but may alternatively be stored on a disk storage device, a virtual memory device or any other storage means internal or external to the computer system. Software routine 102 is able to store data to, and retrieve data from, data item 104. For example, software routine 102 can store a numerical value in data item 104. Alternatively, software routine 102 can store a memory pointer in data item 104. A memory pointer is an address to a location in a memory of the computer system as is well known in the art. Further alternative data that can be stored in data item 104 includes character string data, date information, multi-media data such as images, sound or video, or any other format of data. Data stored in data item 104 is known as the value of data item 104, and the value of data item 104 can be changed by the software routine 102 in execution. Thus, data item 104 is known as a variable data item. Software routine 102 also includes a trace point 106. In the illustrated embodiment, trace point 106 is a software instruction inserted at a specific point into the list of instructions of software routine 102. For example, trace point 106 can be inserted at the end of a Java software method. Trace point 106 is executed along with the list of instructions of software routine 102. In the illustrated embodiment, software routine 102 operates in two modes: in a first mode, software routine 102 causes trace point 106 to call a profile set generator 108; and in a second mode, software routine 102 causes trace point 106 to call a profile checker 116. This is described in detail below.

FIG. 1b further includes a validator 118 for validating a value of the data item 104. Validator 118 includes profile set generator 108 which generates a profile set 110. In the illustrated embodiment, profile set generator 108 is a software module which is functionally connected to the software routine 102. Alternatively, the profile set generator 108 forms part of the software routine 102, such as a subroutine of software routine 102. In a further alternative, profile set generator 108 may comprise apparatus operable to generate the profile set 110. Such an apparatus may be a dedicated device or a general purpose device. The profile set generator 108 is executed by trace point 106 when software routine 102 is operating in the first mode. The profile set generator 108 is able to read a value of data item 104 to generate the profile set 110. The profile set 110 is a set of data elements stored in a data store of the computer system. In the illustrated embodiment profile set 110 is stored in a memory of the computer system, but may alternatively be stored on a disk storage device, a virtual memory device or any other storage means within the computer system.

In operation, trace point 106 can execute multiple times during the execution of software routine 102 in the first mode, or during multiple executions of software routine 102 in the first mode. Consequently, the profile set generator 108 can also execute multiple times as it is called by the trace point 106. Each time the profile set generator 108 is executed, a value of data item 104 is read and recorded as a new data element in profile set 110. Data item 104 is a variable data item and consequently, after multiple executions of the profile set generator 108, a range of values may be recorded in profile set 110. Profile set 110 therefore includes a set of typical values of data item 104 during the execution of software routine 102, and profile set 110 is thus considered to be a profile of data item 104.

Below is an example of a profile set 110 as defined using formal notation. The example profile set 110 includes three elements inserted by the profile set generator 108:

Profile Set $110=\{\Box Z:(x=5^-)(x=12^-)(x=3)\}$.

In the profile set 110 above the following notation is used:
x is an identifier corresponding to "all elements";
$^-$ is a mathematical operator corresponding to the logical OR operation;
"Z" is a set of integers containing all whole numbers, positive and negative, and zero. For example, Z contains numbers such as '6', '−3', '0' and so on;
"{ . . . }" is formal notation representing "the set of". A definition of a set is included within the curly brackets in place of " . . . ";
"$\Box$" is formal notation representing "belonging to"; and
":" is formal notation representing "where x satisfies".

Thus the example profile set 110 above can be described in English as "the set of all elements belonging to the set of integers where all elements have a value of '5', or all elements have a value of '12', or all elements have a value of '3'".

Validator 118 further includes a profile rule generator 112 which generates a profile rule 114. In the illustrated embodiment, profile rule generator 112 is a software module. Alternatively, the profile rule generator 112 forms part of the software routine 102, such as a subroutine of software routine 102. In a further alternative, profile rule generator 112 may comprise apparatus operable to generate the profile rule 114. Such an apparatus may be a dedicated device or a general purpose device. The profile rule generator 112 is able to read the data elements of profile set 110 to generate the profile rule 114. The profile rule 114 is a logical rule which represents the data elements in the profile set 110. Below is an example of a profile set 110 and a corresponding profile rule 114 defined using formal notation.

Profile Set $110=\{x\Box Z:(x=5^-)(x=12^-)(x=3)\}$
Profile Rule $114=(x=5^-)(x=12^-)(x=3)$ The example profile set 110 above is described by the profile rule 114 as a discrete enumeration of values, and can be described in English as "all elements have a value of '5', or all elements have a value of '12', or all elements have a value of '3'". In this example, the profile rule 114 represents the profile set 110 explicitly. Alternatively, the profile rule 114 can describe an approximation of the profile set 110. For example, the exemplary profile set 110 above can also be validly described by the following profile rule 114:

Profile Rule $114=(x\Box 3^-)(x\Box 12)$.

In the profile rule 114 above, $^-$ is a mathematical operator corresponding to the logical AND operation. This profile rule 114 can be described in English as "all elements have a value greater than or equal to 3, and all elements have a value less than or equal to 12". Other alternative profile rules 114 for the exemplary profile set 110 above can also be used. The profile rule 114 is said to describe the data elements in the profile set 110, and the profile set 110 is considered to be a profile of data item 104. Thus, profile rule 114 is also considered to be a profile of data item 104. In the illustrated embodiment, profile rule generator 112 generates profile rule 114 after multiple executions of the profile set generator 108 such that there may be multiple data elements in profile set 110. Consequently, profile rule 114 represents a description of typical values of data item 104 during the execution of software routine 102.

Validator 118 further includes a profile checker 116 which checks if a value of data item 104 satisfies the profile rule 114. In the illustrated embodiment, profile checker 116 is a software module which is functionally connected to the software routine 102. Alternatively, the profile checker 116 forms part of the software routine 102, such as a subroutine of software routine 102. In a further alternative, profile checker 116 may comprise apparatus operable to check if a value of data item 104 satisfies the profile rule 114. Such an apparatus may be a dedicated device or a general purpose device. The profile checker 116 is executed by trace point 106 when software routine 102 is operating in the second mode.

In operation, trace point 106 executes profile checker 116 during the execution of software routine 102 in the second mode. When the profile checker 116 is executed, a value of data item 104 is read by profile checker 116 and checked to determine if it satisfies the profile rule 114. As described above, profile rule 114 represents a description of typical values of data item 104 during the execution of software routine 102. Thus if profile checker 116 determines that the value of data item 104 does not satisfy the profile rule 114, then the profile checker 116 has identified a value of data item 104 which is not a typical value. This determination is advantageous as it may indicate that there is a problem with the execution of software routine 102. Alternatively, this determination may suggest that data item 104 has a value which was not recorded by the profile set generator 108.

In response to a determination that data item 104 has a value which is not a typical value, measures can be taken to monitor the execution of software routine 102 or remedy any problem with the execution of software routine 102. For example, the execution of software routine 102 can be monitored by recording detailed information relating to the execution of software routine 102 and the value of data item 102. Such monitoring techniques are well known in the art of software tracing. If software routine 102 subsequently terminates through an error, such detailed information can be helpful in determining the cause of the error, as is well known in the art. Alternatively, the data item 104 can be marked as erroneous, and all future accesses to data item 104 by software routine 102 can be prevented in order to avoid potential errors in software routine 102 through the use of erroneous data. Additionally, an atypical value of data item 104 as identified by profile checker 116 can be added as a new data element to profile set 110 by profile set generator 108, and profile rule 114 can be updated to reflect the new data element in profile set 110. This would serve to prevent the value of data item 104 from being identified as an atypical value in future executions of software routine 102. This is advantageous where the atypical value of data item 104 does not correspond to a problem with the execution of software routine 102, and so should be considered one of the profile set 110 of typical values. Other alternative techniques to monitor a software routine and techniques to mitigate a problem with a software routine are well known in the art of software tracing and problem determination, and can be employed in response to a determination that data item 104 has a value which is not a typical value.

Figure 2A:
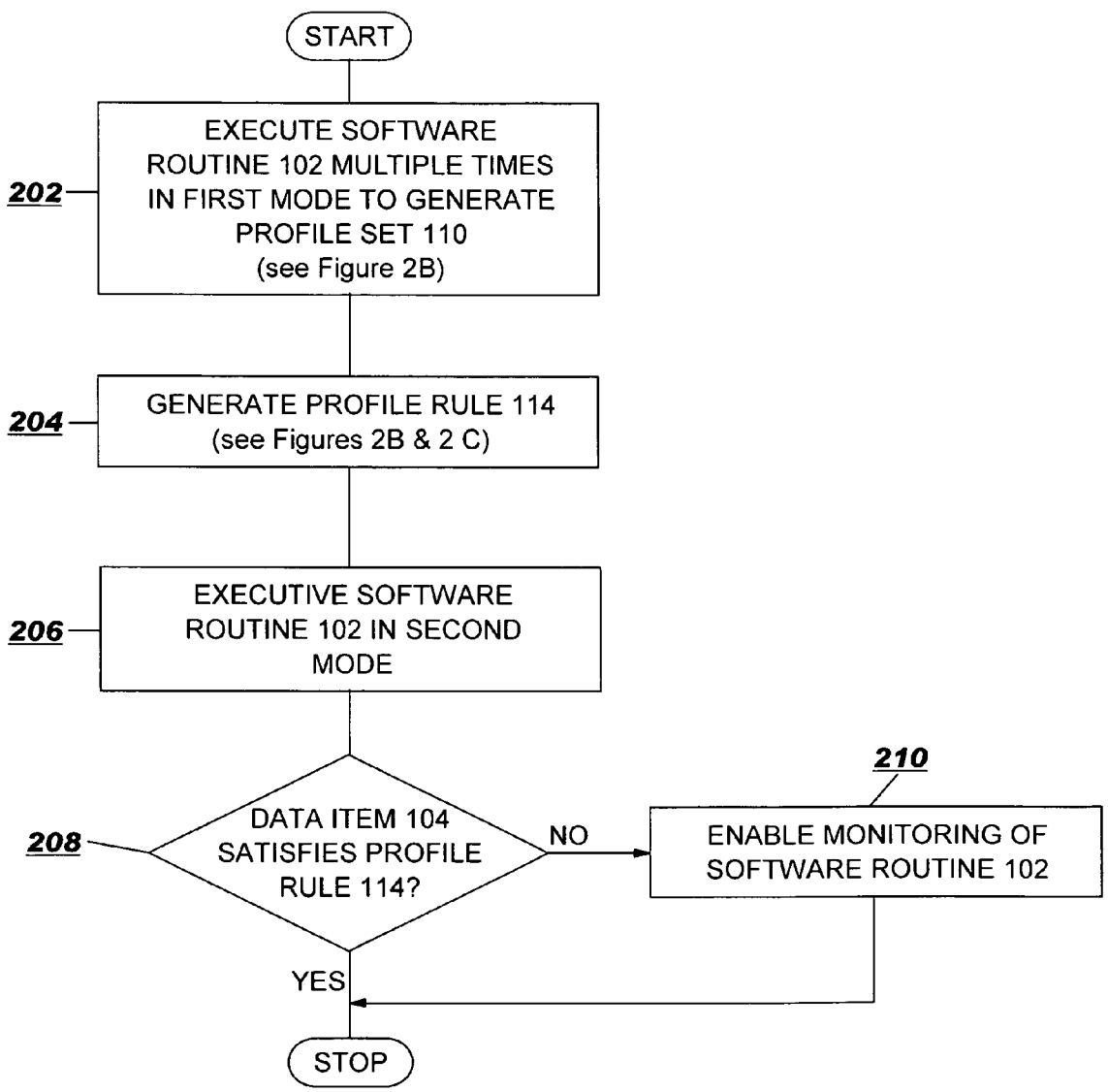
FIG. 2a is a flowchart illustrating an exemplary method in accordance with one aspect of the present invention.

FIG. 2a is a flowchart illustrating an exemplary method of an illustrated embodiment of the present invention. At step 202, software routine 102 is executed multiple times in the first mode. This causes the trace point 106 to invoke the profile set generator 108 to generate the profile set 110. In the illustrated embodiment, software routine 102 is executed a sufficient number of times to allow the profile set generator 108 to generate a profile set 110 which includes data elements containing all of the typical values of data item 104. A sufficient number of times to execute software routine 102 can be determined by the extent to which software routine 102 alters the value of data item 104. For example, if software routine 102 alters the value of data item 104 frequently, a small number of iterations may suffice (e.g. 5 iterations). Alternatively, if software routine 102 rarely alters the value of data item 104, a large number of iterations may be required (e.g. thousands of iterations). At step 204, profile rule generator 112 generates profile rule 114 using the profile set 110. Alternatively, step 204 can be incorporated as part of step 202 and the profile rule generator 112 can generate the profile rule 114 during the generation of the profile set 110. At step 206, software routine 102 is executed in the second mode, causing trace point 106 to invoke the profile checker 116. At step 208, the profile checker 116 determines if a value of data item 104 satisfies the profile rule 114. If the value of data item 104 does not satisfy the profile rule 114 the method proceeds to step 210 where a monitoring process is executed to monitor the execution of the software routine 102. Such a monitoring process is well known in the art of software tracing. Alternatively, at step 210, the data item 104 is marked as erroneous to prevent all future accesses to data item 104 by software routine 102 in order to avoid potential errors in software routine 102 through the use of erroneous data. As a further alternative, at step 210, the value of data item 104 is added as a new data element to profile set 110 by profile set generator 108, and profile rule 114 is updated to reflect the new data element in profile set 110. Other alternative techniques to monitor a software routine and techniques to mitigate a problem with a software routine are well known in the art of software tracing and problem determination, and can be employed at step 210. Thus the method of FIG. 2a provides a way for a profile rule 114 to be generated for data item 104, and for a value of the data item 104 to be checked to determine if it satisfies the profile rule 114. Where values of the data item 104 do not satisfy the profile rule 114, monitoring or corrective measures can be taken.

Figure 2B:
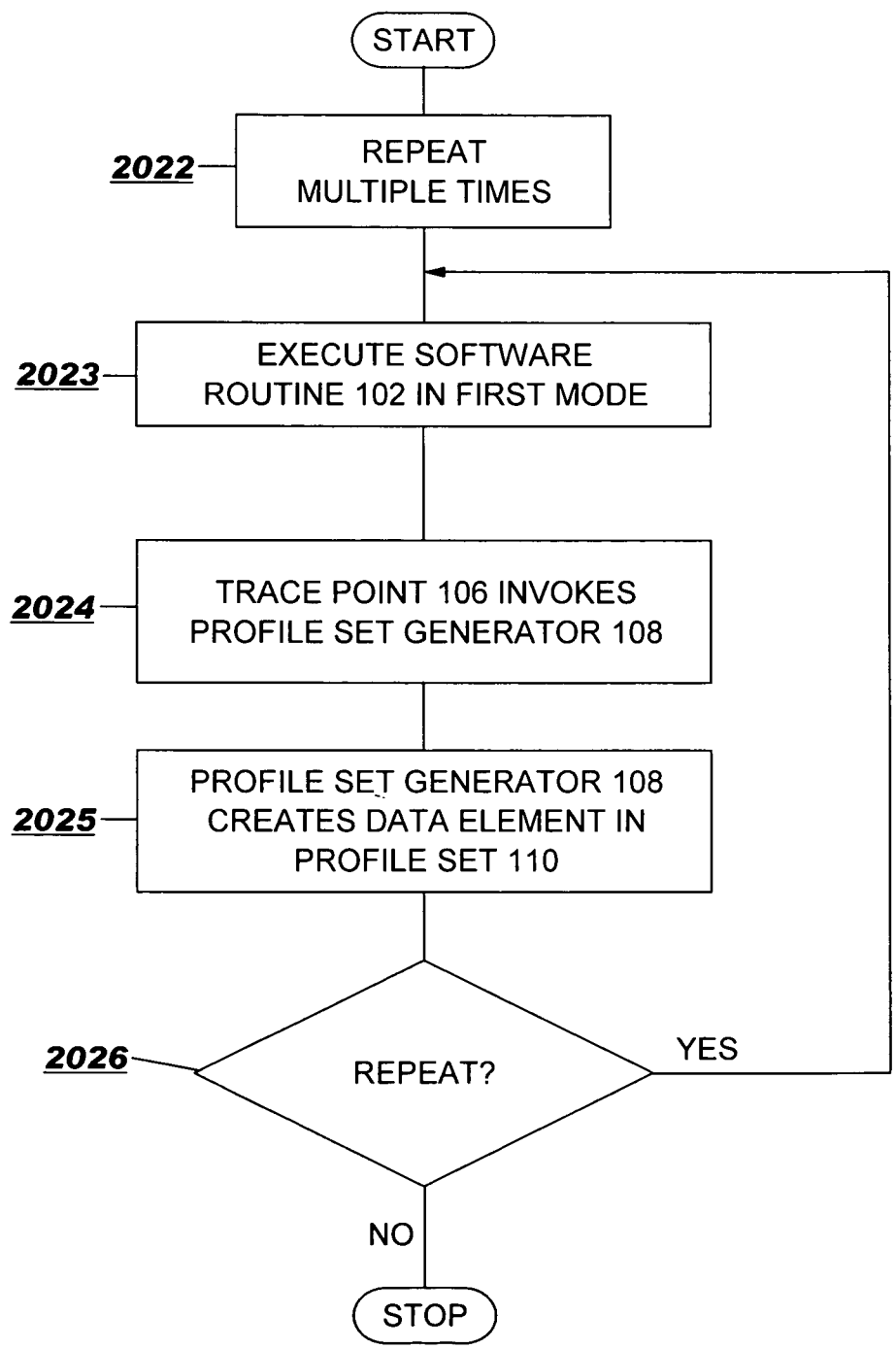
FIG. 2b is a flowchart illustrating an exemplary method for generating the profile set 110 of FIG. 1b.

Step 202 of FIG. 2a will now be considered in more detail with reference to FIG. 2b. FIG. 2b is a flowchart illustrating an exemplary method for generating the profile set 110 of FIG. 1b. At step 2022, a loop is initiated of multiple iterations. An appropriate number of iterations is described above with respect to step 202 of FIG. 2a. For each iteration of the loop, at step 2023 software routine 102 is executed in the first mode. Subsequently, at step 2024, trace point 106 is executed and invokes the profile set generator 108. At step 2025, the profile set generator 108 reads a value of data item 104 and records the value as a new data element in profile set 110. Subsequently, at step 2026, the method returns to step 2023 to complete the appropriate number of iterations of the loop. In this way, the method of FIG. 2b generates the profile set 110 of typical values of data item 104.

A first arrangement of data item 104 will now be considered, wherein data item 104 is configured to store numerical data, and thus the profile set 110 is a set of numerical elements. As described above, an appropriate profile rule 114 to describe the profile set 110 of numerical elements can include a maximum and minimum value, such as:

Profile Rule 114=(x☐MINIMUM VALUE~) (x☐MAXIMUM VALUE)

Figure 2C:
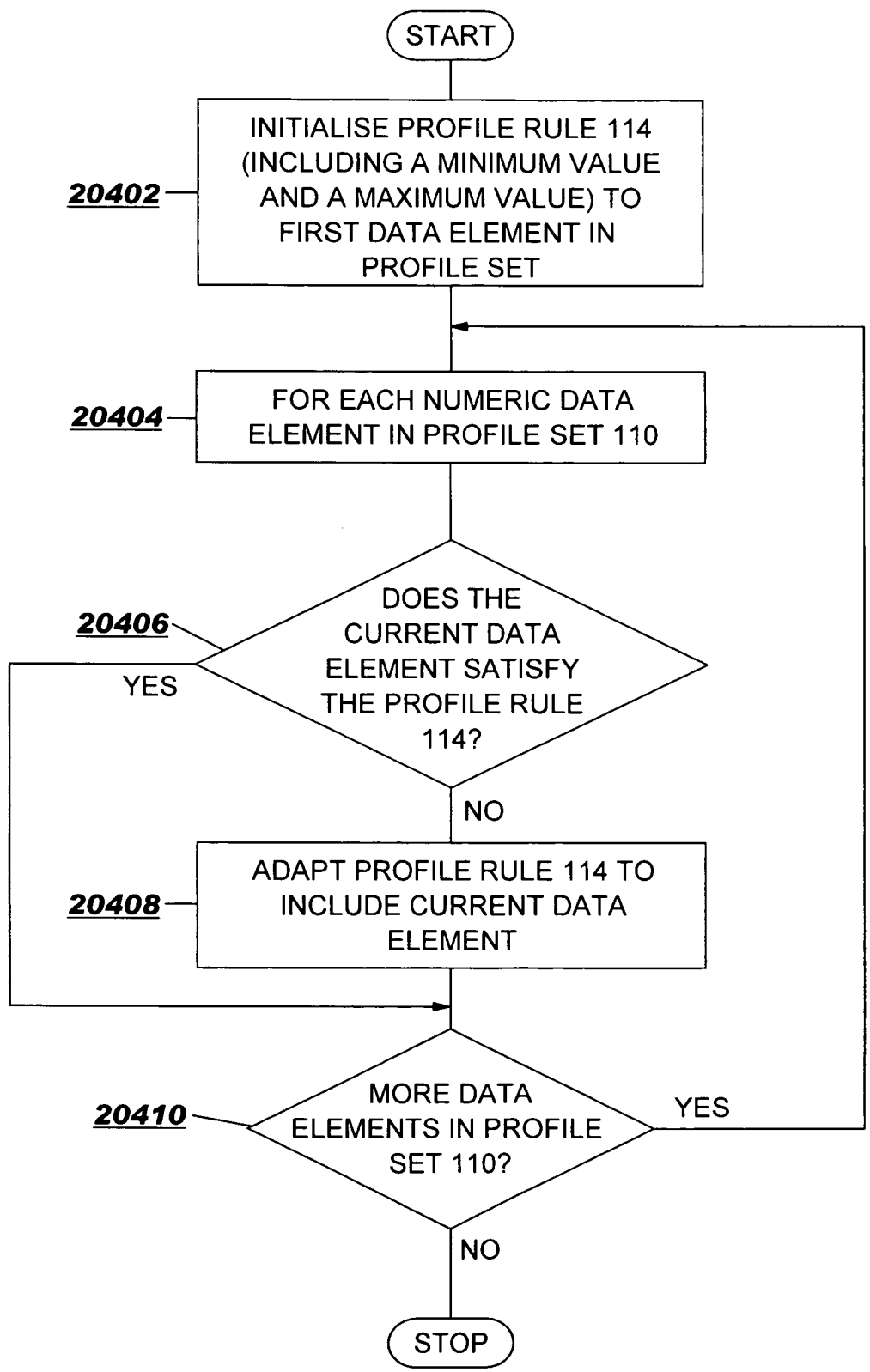
FIG. 2c is a flowchart illustrating an exemplary method for generating the profile rule 114 of FIG. 1b from the profile set 110 where data item 104 is used to store numerical data.

In this way, the profile rule 114 can be used to describe a range of typical values in the profile set 110. FIG. 2c is a flowchart illustrating an exemplary method for generating the profile rule 114 of FIG. 1b from the profile set 110 where data item 104 is used to store numerical data. The method of FIG. 2c corresponds to step 204 of FIG. 2a for the first arrangement of data item 104. At step 20402 the profile rule 114 is initialised to describe a set of numerical data elements and includes a minimum value and a maximum value. The minimum and maximum values are initialised to be the value of a first data element in the profile set 110. At step 20404 a loop is initiated through each data element in the profile set 110. At step 20406, for each data element in the profile set 110, the value of the current data element is checked to determine if it satisfies the profile rule 114. For the value of a data element to satisfy the profile rule 114, it must be greater than or equal to the minimum value, and less than or equal to the maximum value. If the value of the current data element does not satisfy the profile rule 114, the profile rule 114 is adapted to include the value of the current data element at step 20408. The profile rule 114 is adapted by altering the minimum and maximum values to widen the range of the profile rule 114 such that the range includes the value of the current data element. The method loops through all data elements in the profile set 110 at step 20410. In this way, the method of FIG. 2c generates the profile rule 114 for a profile set 110 comprising numerical data elements. Thus the profile rule 114 represents a typical range of values store in data item 104.

Once the profile rule 114 is generated it can be used to determine if a value of the data item 104 is a typical value, as illustrated at step 208 of FIG. 2a. In the first arrangement, the numerical profile rule 114 described above can be applied to a numerical value of data item 104 by simply checking if the value of data item 104 is greater than or equal to the minimum value, and less than or equal to the maximum value.

A second arrangement of data item 104 will now be considered, wherein data item 104 is configured to store memory pointer data, and thus profile set 110 is a set of memory pointers. In the illustrated embodiment, a memory pointer is a binary number referencing a location in a memory of the computer system. A memory pointer can be represented in binary using the binary digits '0' or '1' in bit positions which are numbered consecutively from the least significant bit of the memory pointer. An example of a memory pointer is illustrated in binary below with the value '1010'. Beneath the example memory pointer, each bit position is numbered consecutively from '0' to '3' from the least significant bit. In this way, individual bits of a memory pointer can be referenced.

| MEMORY POINTER | 1 0 1 0 |
|---|---|
| BIT POSITION | 3 2 1 0 |

Figure 3A:
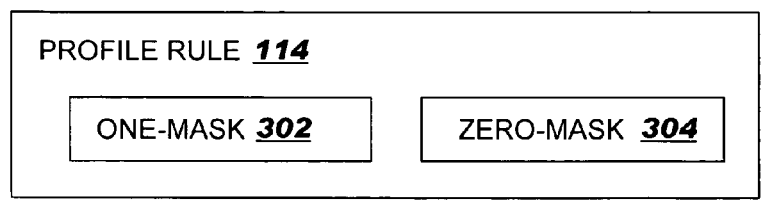
FIG. 3a is a block diagram illustrating the profile rule 114 of FIG. 1b where data item 104 is used to store memory pointer data.

One way for the profile rule 114 to describe a profile set 110 of memory pointers is to use two binary masks, known as a ONE-MASK 302 and a ZERO-MASK 304 (see FIG. 3a). A binary mask is a binary number which is used as an operand to a logical operation, such as a logical AND operation. Each bit position of the binary masks represents the corresponding bit position of all memory pointer elements in profile set 110. A value of '1' in a bit position of the ONE-MASK 302 indicates that the corresponding bit position of all memory pointer elements in profile set 110 is typically set to the value '1'. Similarly, a value of '1' in a bit position of the ZERO-MASK 304 indicates that the corresponding bit position of all memory pointer elements in profile set 110 is typically set to the value '0'. Below is a simple example of a profile set 110 comprising memory pointer elements and a corresponding profile rule 114 including a ONE-MASK 302 and a ZERO-MASK 304:

| Profile Set 110 : {x☐MEMORY POINTERS:(x='1100')(x='0110') |
|---|
| (x='1110')} |
| Profile Rule 114 : ONE-MASK 302 = '0100' |
| ZERO-MASK 304 = '0001'. |

The example profile set 110 above can be described in English as "the set of all elements belonging to the set of memory pointers where all elements have a value of '1100', or all elements have a value of '0110', or all elements have a value of '1110'". Thus the example profile set 110 includes three memory pointers with values '1100', '0110' and '1110'. The profile rule 114 represents typical features of this profile set 110 using the ONE-MASK 302 and the ZERO-MASK 304. The ONE-MASK 302 has a binary value of '1' in bit position two. This indicates that the memory pointers in the profile set 110 typically have a binary value of '1' in bit position two. Similarly, the ZERO-MASK 304 has a binary value of '1' in bit position zero. This indicates that the memory pointers in the profile set 110 typically have a binary value of '0' in bit position zero. Notice that neither the ONE-MASK 302 or the ZERO-MASK 304 include a binary value of '1' in bit positions one or three. This indicates that memory pointers in the profile set 110 can typically have either values of '0' or '1' in bit positions one and three. In this way the profile rule 114 can be used to describe typical values of specific bit positions in memory pointer elements of the profile set 110.

Figure 2D:
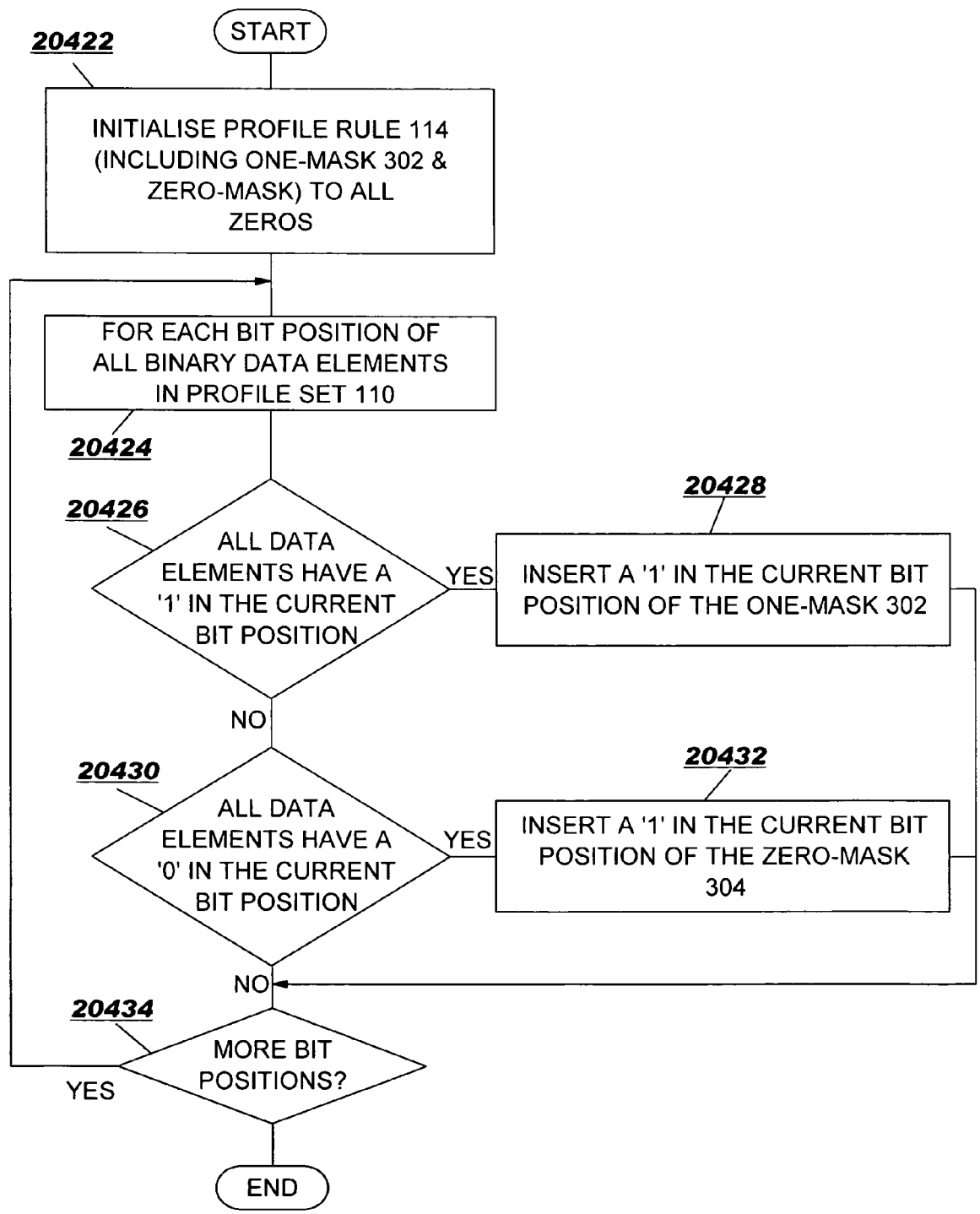
FIG. 2d is a flowchart illustrating an exemplary method for generating the profile rule 114 of FIG. 1b from the profile set 110 where data item 104 is used to store memory pointer data.

FIG. 2d is a flowchart illustrating an exemplary method for generating the profile rule 114 of FIG. 1b from the profile set 110 where data item 104 is used to store memory pointer data. The method of FIG. 2d corresponds to step 204 of FIG. 2a for the second arrangement of data item 104. At step 20422 the profile rule 114 is initialised including two binary masks: a ONE-MASK 302; and a ZERO-MASK 304. The binary masks are initialised so that all bits are set to '0'. At step 20424 a loop is initialised through each bit position of the memory pointer elements of profile set 110. Thus initially bit position zero is processed for all memory pointer elements in the profile set 110, followed by bit position one and so on. At step 20426, for the current bit position, the method determines if all of the memory pointer elements in profile set 110 have a value of '1' in the current bit position. Alternatively, the method could identify if the current bit position typically has a value of '1' by determining if a particular proportion of the memory pointer elements in profile set 110 have a value of '1' in the current bit position. For example, if more than ninety-five percent of the memory pointer elements have a value of '1' in the current bit position, the current bit position could be said to typically have the value '1'. If step 20426 determines that a value of '1' is typically in the current bit position, step 20428 inserts a value of '1' into the corresponding bit position of the ONE-MASK 302. If step 2042 determines that a value of '1' is not typically in the current bit position, step 20430 determines if a value of '0' is typically in the current bit position using a similar technique to that of step 20426. If step 20430 determines that a value of '0' is typically in the current bit position, step 20432 inserts a value of '1' into the corresponding bit position of the ZERO-MASK 304. Subsequently, at step 20434, the loop through each bit position is repeated. Thus in this way a profile rule 114 is generated to describe typical values of specific bit positions in memory pointer elements of the profile set 110.

Figure 3B:
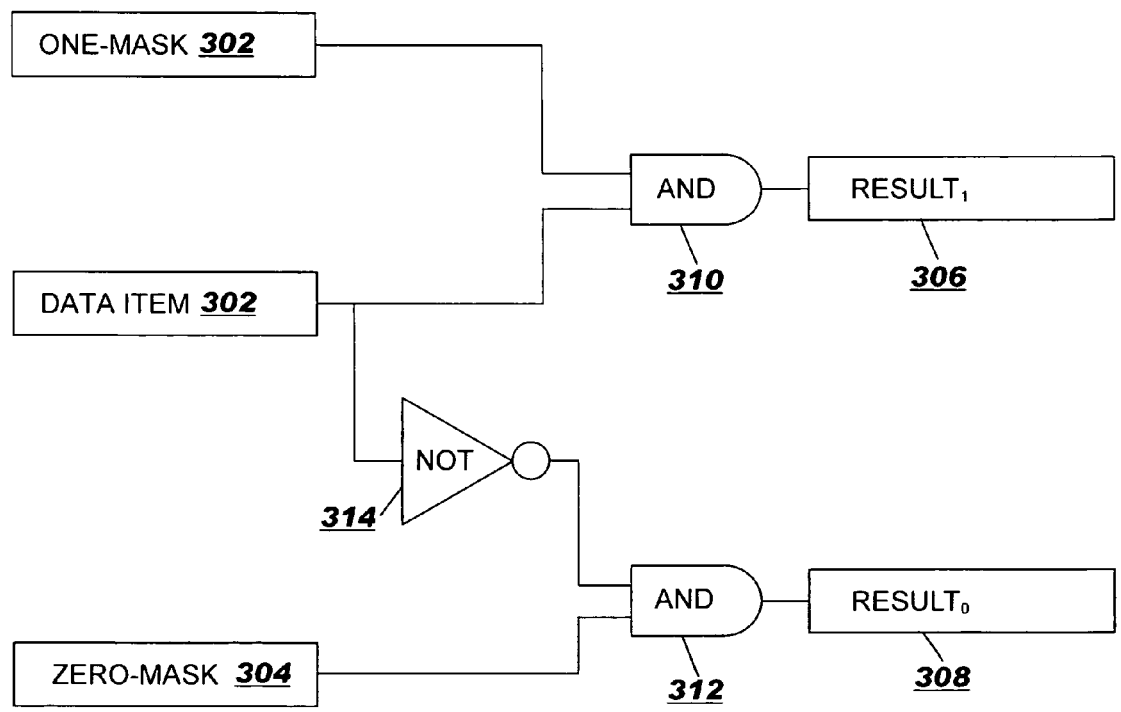
FIG. 3b illustrates a logical test performed by profile checker 116 of FIG. 1b where data item 104 is used to store memory pointer data.

Once the profile rule 114 is generated it can be used to determine if a value of the data item 104 is a typical value, as illustrated at step 208 of FIG. 2a. FIG. 3b illustrates a logical test performed by profile checker 116 of FIG. 1b where data item 104 is used to store memory pointer data. The logical test of FIG. 3b is illustrated using logical gates. In the illustrated embodiment the logical test of FIG. 3b is implemented in a software routine in a computer system. Alternatively, the logical test of FIG. 3b may be implemented in hardware within a dedicated device or a general purpose device. The logical test takes as input a ONE-MASK 302 and a ZERO-MASK 306 which collectively constitute a profile rule 114. Additionally, the logic test takes as input a value of data item 104. The logic test provides as output $RESULT_1$ 306 and RESULT$_0$ 308. RESULT$_1$ 306 and RESULT$_0$ 308 are binary numbers which can be used to indicate the success or failure of the test. The RESULT$_1$ 306 is obtained by performing a logical AND operation 310 on the ONE-MASK 302 and the value of the data item 104. The RESULT$_0$ 308 is obtained by performing a logical AND operation 312 on the ZERO-MASK 304 and the result of a logical NOT operation 314 on the value of the data item 104. The following conditions are satisfied when the logical test is successful: RESULT$_1$ 306 has a value which is identical to the value of ONE-MASK 302; and RESULT$_0$ 308 has a value which is identical to value of ZERO-MASK 304. Any other values of RESULT$_1$ 306 and RESULT$_0$ 308 indicate failure of the test. In this way, whether a memory pointer stored in data item 104 has a typical value can be determined by a success of the logical test described above.

As an alternative to the use of binary masks in profile rule 114 to represent a profile set 110 of memory pointer elements, other masks could be used for a profile set 110 of data elements of another data type. For example, profile rule 114 can include a character mask to represent a profile set 110 of mixed string and numerical data elements. Such a character mask might include indicators of numerical characters and alphabetic characters. An example of a character mask is provided below:

"XXX999"

The example character mask provided above represents data elements in profile set 110 each of which are comprised of three alphabetic characters followed by three numerical characters. Similar masks could be defined to represent multimedia data, such as image masks or sound masks.

The illustrated embodiment of the present invention will now be described in use for the first arrangement of data item 104, wherein data item 104 is configured to store numerical data. Below is a first example of software routine 102 written in pseudo code. The first example of software routine 102 includes a data item 104 which is assigned a random value between zero and ten at each execution of the software routine 102. The software routine 102 also includes trace point 106.

First Example Software Routine 102

```
BEGIN
    DATA ITEM 104 = RANDOM NUMBER BETWEEN ZERO AND
    TEN
    TRACE POINT 106
END
```

The method of FIG. 2a will now be considered for the first example of software routine 102 above. At step 202, the software routine 102 is executed multiple times in the first mode to generate a profile set 110. Taking an appropriate number of iterations of execution of software routine 102 to be five iterations, an example of the profile set 110 which may be produced after step 202 is provided below.

| Iteration of Software Routine 102 | Value of Data Item 104 |
|---|---|
| 1 | 3 |
| 2 | 4 |
| 3 | 7 |
| 4 | 5 |
| 5 | 8 |

Thus the profile set 110 can be expressed in formal notation as:

Profile Set 110={(x=3$^-$)(x=4)(x=7$^-$)(x=5$^-$)(x=8$^-$)}.

Subsequently, at step 204, the profile rule generator 112 generates profile rule 114 from profile set 110. Step 204 is elaborated in FIG. 2c for a profile set 110 of numerical elements. Considering briefly the steps of FIG. 2c, at 20402 a profile rule 114 is initialised including a minimum value and a maximum value. Both the minimum value and the maximum value are assigned the value of a first element in the profile set 110. Thus, initially at step 20402, the profile rule 114 is:

Profile Rule 114=(x□3$^-$) (x□3).

Subsequently at steps 20404 to 20408, the method loops through all elements in profile set 110, adapting the profile rule 114 accordingly. The resulting profile rule 114 after the method of FIG. 2c is thus:

Profile Rule 114=(x□3$^-$) (x□8).

Returning now to the method of FIG. 2a, at step 206 the software routine 102 is executed in the second mode, and at step 208 a value of data item 104 is checked to determine if it satisfies the profile rule 114. For the purpose of demonstration, various values of data item 104 will be considered for the software routine 102 executed in the second mode. The table below demonstrates how various values of data item 104 at step 208 can satisfy or fail to satisfy the profile rule 114 above:

| Value of Data Item 104 at step 208 | Satisfy Profile Rule 114 ? |
|---|---|
| 6 | YES |
| 4 | YES |
| 2 | NO |
| 3 | YES |
| 9 | NO |

Thus, for the values of data item 104 which do not satisfy the profile rule 114, the method proceeds to step 210 where a monitoring process is initiated to monitor the execution of the software routine 102.

The illustrated embodiment of the present invention will now be described in use for the second arrangement of data item 104, wherein data item 104 is configured to store memory pointer data. Below is a second example of software routine 102 written in pseudo code. The second example of software routine 102 includes a data item 104 which is assigned a memory pointer at each execution of the software routine 102 as a result of a memory allocation function. Such a memory allocation function is typically provided by operating systems and programming libraries and is well known in the art. The software routine 102 also includes trace point 106.

Second Example Software Routine 102

```
BEGIN
    DATA ITEM 104 = ALLOCATE MEMORY (100 BYTES)
    TRACE POINT 106
END
```

The method of FIG. 2a will now be considered for the second example of software routine 102 above. At step 202, the software routine 102 is executed multiple times in the first mode to generate a profile set 110. Taking an appropriate number of iterations of execution of software routine 102 to be five iterations, an example of the profile set 110 of memory pointer elements which may be produced after step 202 is provided below.

| Iteration of Software Routine 102 | Value of Data Item 104 |
|---|---|
| 1 | '110101' |
| 2 | '100100' |
| 3 | '100101' |
| 4 | '110001' |
| 5 | '110101' |

The profile set 110 can be expressed in formal notation as:

| Profile Set 110 = { x ☐ MEMORY POINTERS: | (x='110101')(x='100100') (x='100101')(x='110001') (x='110101') } |
|---|---|

Subsequently, at step 204, the profile rule generator 112 generates profile rule 114 from profile set 110. Step 204 is elaborated in FIG. 2d for a profile set 110 of memory pointer elements. Considering briefly the steps of FIG. 2d, at 20422 a profile rule 114 is initialised including a binary ONE-MASK 302 and a binary ZERO-MASK 304. All bits of both of the binary masks are initially assigned the value '0'. Thus, initially at step 20422, the profile rule 114 is:

| Profile Rule 114 | : ONE-MASK 302 = '000000' ZERO-MASK 304 = '000000'. |
|---|---|

Subsequently at step 20424, the method loops through each bit position of all memory pointer elements in profile set 110. This is described with the aid of the table below which illustrates the contents of the profile set 110. In the table below, each of the five memory pointer elements in the profile set 110 is divided into six bit positions. Each bit position is numbered consecutively from zero to five, with the zeroth bit position corresponding to the least significant bit in each memory pointer.

| Memory Pointer Element of Profile Set 110 | Bit Position | | | | | |
|---|---|---|---|---|---|---|
| | 5 | 4 | 3 | 2 | 1 | 0 |
| 1 | 1 | 1 | 0 | 1 | 0 | 1 |
| 2 | 1 | 0 | 0 | 1 | 0 | 0 |
| 3 | 1 | 0 | 0 | 1 | 0 | 1 |
| 4 | 1 | 1 | 0 | 0 | 0 | 1 |
| 5 | 1 | 1 | 0 | 1 | 0 | 1 |

In looping through each of the six bit positions, step 20424 starts at bit position zero. At step 20426 the method determines if all memory pointer elements in profile set 110 have a value of '1' in bit position zero. As can be seen from the table above, four of the five memory pointer elements in profile set 110 have a value of '1' in bit position zero, and consequently the method proceeds to step 20430. At step 20430, the method determines if all memory pointer elements in profile set 110 have a value of '0' in bit position zero. As can be seen from the table above, only one of the five memory pointer elements have a value of '0' in bit position zero, and consequently the method proceeds to step 20434. At step 20434 the loop is continued for bit positions have been processed in this way. When step 20426 of the method determines that all memory pointer elements in profile set 110 have a value of '1' in a bit position (as is the case for bit position five), step 20428 inserts a value of '1' into that bit position of the ONE-MASK 302. Similarly, when step 20430 of the method determines that all memory pointer elements in profile set 110 have a value of '0' in a bit position (as is the case for bit positions one and three), step 20432 inserts a value of '1' into that bit position of the ZERO-MASK 302. In this way the profile rule below is defined for the profile set 110.

| Profile Rule 114 | : ONE-MASK 302 = '100000' ZERO-MASK 304 = '001010' |
|---|---|

Returning now to the method of FIG. 2a, at step 206 the software routine 102 is executed in the second mode, and at step 208 a value of data item 104 is checked to determine if it satisfies the profile rule 114. For the purpose of demonstration, various values of data item 104 will be considered for the software routine 102 executed in the second mode. The table below illustrates three examples of values of data item 104 at step 208.

| Example Number | Value of Data Item 104 at step 208 |
|---|---|
| 1 | '110101' |
| 2 | '100010' |
| 3 | '011011' |

Considering example number one from the table above, step 208 determines if a value of '110101' in data item 104 satisfies the following profile rule 114:

| Profile Rule 114 | : ONE-MASK 302 = '100000' ZERO-MASK 304 = '001010'. |
|---|---|

Using the logical rule of FIG. 3b to determine if the value of data item 104 satisfies the profile rule 114, the value of $RESULT_1$ 306 is evaluated as follows:

| $RESULT_1$ 306 = ONE-MASK 302 $\tilde{\cap}$ DATA ITEM 104 = '100000' $\tilde{\cap}$ '110101' = '100000'. |
|---|

The value of $RESULT_0$ 308 is evaluated as follows:

| $RESULT_0$ 308 = ZERO-MASK 304 $\tilde{\cap}$ ($\neg$ DATA ITEM 104) = '001010' $\tilde{\cap}$ ($\neg$ '110101') = '001010' $\tilde{\cap}$ '001010' = '001010'. |
|---|

Where $\neg$ is a formal notation for the logical NOT operation. From these evaluations it can be seen that: $RESULT_1$ 306 has a value which is identical to the value of ONE-MASK 302; and $RESULT_0$ 308 has a value which is identical to the value of ZERO-MASK 304. Thus according to the logical rule of FIG. 3b the value of data item 104 in example one of the above table satisfies the profile rule 114.

Now considering example number two from the table above, step 208 determines if a value of '100010' in data item 104 satisfies the profile rule 114. Using the logical rule of FIG. 3b to determine if the value of data item 104 satisfies the profile rule 114, the value of $RESULT_1$ 306 is evaluated as follows:

$$RESULT_1\ 306 = \text{ONE-MASK}\ 302\ \bar{\cap}\ \text{DATA ITEM}\ 104$$
$$= \text{'100000'}\ \bar{\cap}\ \text{'100010'}$$
$$= \text{'100000'}.$$

The value of $RESULT_0$ 308 is evaluated as follows:

$$RESULT_0\ 308 = \text{ZERO-MASK}\ 304\ \bar{\cap}\ (\neg\ \text{DATA ITEM}\ 104)$$
$$= \text{'001010'}\ \bar{\cap}\ (\neg\ \text{'100010'})$$
$$= \text{'001010'}\ \bar{\cap}\ \text{'011101'}$$
$$= \text{'001000'}.$$

From these evaluations it can be seen that: $RESULT_1$ 306 has a value which is identical to the value of ONE-MASK 302; and $RESULT_0$ 308 has a value which is not identical to the value of ZERO-MASK 304. Therefore, according to the logical rule of FIG. 3b, the value of data item 104 in example two of the above table does not satisfy the profile rule 114 because $RESULT_0$ 308 has a value which is not identical to the value of ZERO-MASK 304. Thus the value of '100010' in data item 104 is not a typical value of data item 104 and may be erroneous. Consequently, the method of FIG. 2a proceeds to step 210 which invokes software monitoring for software routine 102.

Now considering example number three from the table above, step 208 determines if a value of '011011' in data item 104 satisfies the profile rule 114. Using the logical rule of FIG. 3b to determine if the value of data item 104 satisfies the profile rule 114, the value of $RESULT_1$ 306 is evaluated as follows:

$$RESULT_1\ 306 = \text{ONE-MASK}\ 302\ \bar{\cap}\ \text{DATA ITEM}\ 104$$
$$= \text{'100000'}\ \bar{\cap}\ \text{'011011'}$$
$$= \text{'000000'}.$$

The value of $RESULT_0$ 308 is evaluated as follows:

$$RESULT_0\ 308 = \text{ZERO-MASK}\ 304\ \bar{\cap}\ (\neg\ \text{DATA ITEM}\ 104)$$
$$= \text{'001010'}\ \bar{\cap}\ (\neg\ \text{'011011'})$$
$$= \text{'001010'}\ \bar{\cap}\ \text{'100100'}$$
$$= \text{'000000'}.$$

From these evaluations it can be seen that: $RESULT_1$ 306 has a value which is not identical to the value of ONE-MASK 302; and $RESULT_0$ 308 has a value which is not identical to the value of ZERO-MASK 304. Therefore, according to the logical rule of FIG. 3b, the value of data item 104 in example three of the above table does not satisfy the profile rule 114. Thus the value of '011011' in data item 104 is not a typical value of data item 104 and may be erroneous. Consequently, the method of FIG. 2a proceeds to step 210 which invokes software monitoring for software routine 102.

The flowchart and block diagrams of FIGS. 1b-3b illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is apparent to one skilled in the art that numerous modifications and departures from the specific embodiments described herein may be made without departing from the spirit and scope of the invention.

What is claimed is:

1. A computer-implemented method for operating a validator to validate a variable data item in a software routine in execution, the method comprising:
    recording a first value of the variable data item to a profile set of values in a data store;
    recording a second value of the variable data item to the profile set of values in the data store;
    creating a profile rule, wherein said profile rule represents the profile set of values; and
    determining if a third value of the variable data item satisfies the profile rule.

2. The method of claim 1 wherein the variable data item comprises numerical data.

3. The method of claim 1 wherein the variable data item comprises memory pointer data.

4. The method of claim 1 wherein the variable data item comprises character string data.

5. The method of claim 1 wherein the variable data item comprises multimedia data.

6. The method of claim 1 wherein the data store comprises a memory store.

7. The method of claim 1 wherein the data store comprises a disk storage device.

8. The method of claim 6 wherein the memory store comprises a virtual memory store.

9. The method of claim 1 wherein the software routine comprises a trace point for tracing the execution of the software routine.

10. The method of claim 1 further comprising:
activating a tracing process to trace the execution of the software routine in response to a determination that the third value of the variable data item does not satisfy the profile rule.

11. The method of claim 9 further comprising:
adapting the trace point to trace the execution of the software routine in more detail in response to a determination that the third value of the variable data item does not satisfy the profile rule.

12. The method of claim 1 further comprising:
providing an indicator that the data item has an atypical value in response to a determination that the third value of the variable data item does not satisfy the profile rule.

13. The method of claim 1 further comprising:
adding the third value of the variable data item to the profile set, and adapting the profile rule to include the third value of the variable data item in response to a determination that the third value of the variable data item does not satisfy the profile rule.

14. The method of claim 1 wherein the profile rule comprises a minimum value and a maximum value.

15. The method of claim 1 wherein the profile rule comprises a mask.

16. The method of claim 15 wherein the mask comprises an alphanumeric mask.

17. The method of claim 15 wherein the mask comprises an image mask.

18. The method of claim 15 wherein the mask comprises a sound mask.

19. The method of claim 15 wherein the mask comprises a multimedia mask.

20. The method of claim 1 wherein the profile rule comprises a binary mask.

21. The method of claim 15 wherein the mask comprises a binary mask.

22. The method of claim 21 wherein the binary mask defines a typical value of a bit position of the variable data item.

23. The method of claim 22 wherein the typical value of the bit position comprises a value of the bit position of both the first and second values of the variable data item.

24. The method of claim 23 wherein the typical value of the bit position comprises a value of the bit position of a proportion of the first and second values of the variable data item.

25. A computer program product for validating a variable data item, the computer program product comprising:
a computer readable storage medium having computer readable program code embodied therein, the computer readable program code comprising:
computer readable program code configured to record a first value of the variable data item to a profile set of values in a data store;
computer readable program code configured to record a second value of the variable data item to the profile set of values in the data store;
computer readable program code configured to create a profile rule, wherein said profile rule represents the profile set of values; and
computer readable program code configured to determine if a third value of the variable data item satisfies the profile rule.

26. The computer program product of claim 25 wherein the variable data item comprises numerical data.

27. The computer program product of claim 25 wherein the variable data item comprises memory pointer data.

28. The computer program product of claim 25 wherein the variable data item comprises character string data.

29. The computer program product of claim 25 wherein the variable data item comprises multimedia data.

30. The computer program product of claim 25 wherein the data store comprises a memory store.

31. The computer program product of claim 25 wherein the data store comprises a disk storage device.

32. The computer program product of claim 30 wherein the memory store comprises a virtual memory store.

33. The computer program product of claim 25 wherein the software routine comprises a trace point for tracing the execution of the software routine.

34. The computer program product of claim 25 further comprising:
computer readable program code configured to activate a tracing process to trace the execution of the software routine in response to a determination that the third value of the variable data item does not satisfy the profile rule.

35. The computer program product of claim 33 further comprising:
computer readable program code configured to adapt the trace point to trace the execution of the software routine in more detail in response to a determination that the third value of the variable data item does not satisfy the profile rule.

36. The computer program product of claim 25 further comprising:
computer readable program code configured to provide an indicator that the variable data item has an atypical value in response to a determination that the third value of the variable data item does not satisfy the profile rule.

37. The computer program product of claim 25 further comprising adding the third value of the variable data item to the profile set and adapting the profile rule to include the third value of the variable data item in response to a determination that the third value of the variable data item does not satisfy the profile rule.

38. The computer program product of claim 25 wherein the profile rule comprises a minimum value and a maximum value.

39. The computer program product of claim 25 wherein the profile rule comprises a mask.

40. The computer program product of claim 39 wherein the mask comprises an alphanumeric mask.

41. The computer program product of claim 39 wherein the mask comprises an image mask.

42. The computer program product of claim 39 wherein the mask comprises a sound mask.

43. The computer program product of claim 39 wherein the mask comprises a multimedia mask.

44. The computer program product of claim 25 wherein the profile rule comprises a binary mask.

45. The computer program product of claim 39 wherein the mask comprises a binary mask.

46. The computer program product of claim 45 wherein the binary mask defines a typical value of a bit position of the variable data item.

47. The computer program product of claim 46 wherein the typical value of the bit position comprises a value of the bit position of both the first and second values of the variable data item.

48. The computer program product of claim 46 wherein the typical value of the bit position comprises a value of the bit position of a proportion of the first and second values of the variable data item.

49. An apparatus for validating a value of a variable data item in a software routine in execution comprising:
   a processor and a memory;
   a profile set generator for generating a profile set of typical values of the variable data item;
   a profile rule generator for generating a profile rule representing the profile set; and
   a profile checker for determining if a value of the variable data item satisfies the profile rule.

50. The apparatus of claim 49 wherein the variable data item comprises numerical data.

51. The apparatus of claim 49 wherein the variable data item comprises memory pointer data.

52. The apparatus of claim 49 wherein the variable data item comprises character string data.

53. The apparatus of claim 49 wherein the variable data item comprises multimedia data.

54. The apparatus of claim 49 further comprising a data store.

55. The apparatus of claim 49 wherein the data store comprises a disk storage device.

56. The apparatus of claim 55 wherein the data store comprises a virtual memory store.

57. The apparatus of claim 49 wherein the software routine comprises a trace point for tracing the execution of the software routine.

58. The apparatus of claim 49 wherein the software routine activates a tracing process to trace the execution of the software routine in response to a determination that the third value of the variable data item does not satisfy the profile rule.

59. The apparatus of claim 57 wherein the software routine adapts the trace point to trace the execution of the software routine in more detail in response to a determination that the third value of the variable data item does not satisfy the profile rule.

60. The apparatus of claim 49 further comprising a software routine providing an indicator that the data item has an atypical value in response to a determination that the third value of the variable data item does not satisfy the profile rule.

61. The apparatus of claim 49 further comprising a software routine adding the third value of the variable data item to the profile set and adapting the profile rule to include the third value of the variable data item in response to a determination that the third value of the variable data item does not satisfy the profile rule.

62. The apparatus of claim 49 wherein the profile rule comprises a minimum value and a maximum value.

63. The apparatus of claim 49 wherein the profile rule comprises a mask.

64. The apparatus of claim 63 wherein the mask comprises an alphanumeric mask.

65. The apparatus of claim 63 wherein the mask comprises an image mask.

66. The apparatus of claim 63 wherein the mask comprises a sound mask.

67. The apparatus of claim 63 wherein the mask comprises a multimedia mask.

68. The apparatus of claim 49 wherein the profile rule comprises a binary mask.

69. The apparatus of claim 63 wherein the mask comprises a binary mask.

70. The apparatus of claim 69 wherein the binary mask defines a typical value of a bit position of the variable data item.

71. The apparatus of claim 70 wherein the typical value of the bit position comprises a value of the bit position of both the first and second values of the variable data item.

72. The apparatus of claim 70 wherein the typical value of the bit position comprises a value of the bit position of a proportion of the first and second values of the variable data item.

73. A computer program product comprising:
   a computer readable storage medium having computer readable program code embodied therein, the computer readable program code comprising:
   computer readable program code configured to generate a profile set of typical values of a variable data item in a software routine in execution;
   computer readable program code configured to generate a profile rule representing the profile set; and
   computer readable program code configured to determine if a value of the variable data item satisfies the profile rule.

74. The computer program product of claim 73 wherein the variable data item comprises numerical data.

75. The computer program product of claim 73 wherein the variable data item comprises memory pointer data.

76. The computer program product of claim 73 wherein the variable data item comprises character string data.

77. The computer program product of claim 73 wherein the variable data item comprises multimedia data.

78. The computer program product of claim 73 further comprising a data store.

79. The computer program product of claim 78 wherein the data store comprises a disk storage device.

80. The computer program product of claim 78 wherein the data store comprises a virtual memory store.

81. The computer program product of claim 73 wherein the software routine comprises a trace point for tracing the execution of the software routine.

82. The computer program product of claim 73 further comprising:
   computer readable program code configured to activate a tracing process to trace the execution of the software routine in response to a determination that the third value of the variable data item does not satisfy the profile rule.

83. The computer program product of claim 81 further comprising:
   computer readable program code configured to adapt the trace point to trace the execution of the software routine in more detail in response to a determination that the third value of the variable data item does not satisfy the profile rule.

84. The computer program product of claim 73 further comprising:
   computer readable program code configured to provide an indicator that the data item has an atypical value in response to a determination that the third value of the variable data item does not satisfy the profile rule.

85. The computer program product of claim 73 further comprising computer readable program code configured to add the third value of the variable data item to the profile set and computer readable program code configured to adapt the profile rule to include the third value of the variable data item in response to a determination that the third value of the variable data item does not satisfy the profile rule.

86. The computer program product of claim 73 wherein the profile rule comprises a minimum value and a maximum value.

87. The computer program product of claim 73 wherein the profile rule comprises a mask.

88. The computer program product of claim 87 wherein the mask comprises an alphanumeric mask.

89. The computer program product of claim 87 wherein the mask comprises an image mask.

90. The computer program product of claim 87 wherein the mask comprises a sound mask.

91. The computer program product of claim 87 wherein the mask comprises a multimedia mask.

92. The computer program product of claim 73 wherein the profile rule comprises a binary mask.

93. The computer program product of claim 87 wherein the mask comprises a binary mask.

94. The computer program product of claim 93 wherein the binary mask defines a typical value of a bit position of the variable data item.

95. The computer program product of claim 94 wherein the typical value of the bit position comprises a value of the bit position of both the first and second values of the variable data item.

96. The computer program product of claim 94 wherein the typical value of the bit position comprises a value of the bit position of a proportion of the first and second values of the variable data item.

\* \* \* \* \*